United States Patent
Shi et al.

(10) Patent No.: US 11,066,549 B2
(45) Date of Patent: Jul. 20, 2021

(54) (METH)ACRYLATE FUNCTIONALIZED POLY(METH)ACRYLATE-BLOCK-POLYIMIDE-BLOCK-POLY(METH)ACRYLATE COPOLYMER, PREPARATION METHOD AND USE THEREOF

(71) Applicants: Henkel AG & Co. KGaA, Duesseldorf (DE); Henkel IP & Holding GmbH, Duesseldorf (DE)

(72) Inventors: Zhuming Shi, Shanghai (CN); Cheng Lu, Shanghai (CN); Jiangbo Ouyang, Wallingford, CT (US)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/654,125

(22) Filed: Oct. 16, 2019

(65) Prior Publication Data

US 2020/0048451 A1 Feb. 13, 2020

Related U.S. Application Data

(63) Continuation of application No. PCT/CN2017/081432, filed on Apr. 21, 2017.

(51) Int. Cl.
| | |
|---|---|
| *C08L 53/00* | (2006.01) |
| *C08L 33/08* | (2006.01) |
| *C08L 33/10* | (2006.01) |
| *C08L 79/08* | (2006.01) |
| *C09J 9/00* | (2006.01) |
| *C09J 153/00* | (2006.01) |

(52) U.S. Cl.
CPC ............. *C08L 53/005* (2013.01); *C08L 33/08* (2013.01); *C08L 33/10* (2013.01); *C08L 79/08* (2013.01); *C09J 9/00* (2013.01); *C09J 153/005* (2013.01); *C09J 2301/416* (2020.08)

(58) Field of Classification Search
CPC .......... C08L 33/10; C08L 33/12; C08L 53/00; C08L 53/005; C08L 79/08
See application file for complete search history.

(56) References Cited

U.S. PATENT DOCUMENTS

| | | | |
|---|---|---|---|
| 10,316,128 | B2 | 6/2019 | Yun et al. |
| 10,509,317 | B2 | 12/2019 | Yasuhara et al. |
| 2004/0213994 | A1 | 10/2004 | Kozakai et al. |
| 2006/0110595 | A1 | 5/2006 | Kodama et al. |

FOREIGN PATENT DOCUMENTS

| | | |
|---|---|---|
| CN | 103122068 A | 5/2013 |
| CN | 103289593 A | 9/2013 |
| JP | H03167226 A | 7/1991 |
| JP | 2002341535 A | 11/2002 |
| WO | 9836005 A1 | 8/1998 |
| WO | 2009035958 A2 | 3/2009 |
| WO | 2017047917 A1 | 3/2017 |
| WO | 2017056595 A1 | 4/2017 |

OTHER PUBLICATIONS

International Search Report for International PCT Patent Application No. PCT/CN2017/081432 dated Jan. 25, 2018.
Davidson et al., Type II polymeric photoinitiators (polyetherimides) with built-in amine synergist, J. Photochem. Photobiol. A, 1995, Chemistry 91, pp. 153-163.
Wang et al., The network gel polymer electrolyte based on poly(acrylate-co-imide) and its transport properties in lithium ion batteries, J. Solid State Electrochem., 2009, 13, pp. 1425-1431.
Yakimanskii et al., Grafting copolymerization of vinyl monomers on polyimide macroinitiators by the method of atom transfer radical polymerization, Russian Chemical Bulletin, May 2012, vol. 61, No. 5, pp. 999-1008.

*Primary Examiner* — Ana L. Woodward
(74) *Attorney, Agent, or Firm* — James E. Piotrowski

(57) ABSTRACT

This invention relates to a (meth)acrylate-functionalized poly(meth)acrylate-block-polyimide-block-poly(meth)acrylate copolymer, preparation method and use thereof. The (meth)acrylate-functionalized poly(meth)acrylate-block-polyimide-block-poly(meth)acrylate copolymer according to the present invention exhibits outstanding thermal stability and excellent optical properties.

14 Claims, 3 Drawing Sheets

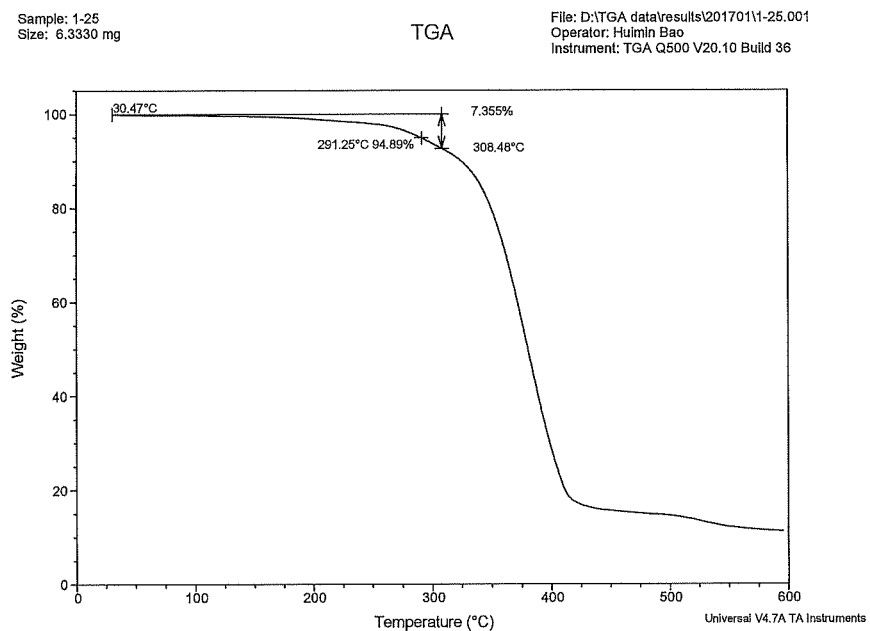
Fig. 3. TGA of copolymer 1
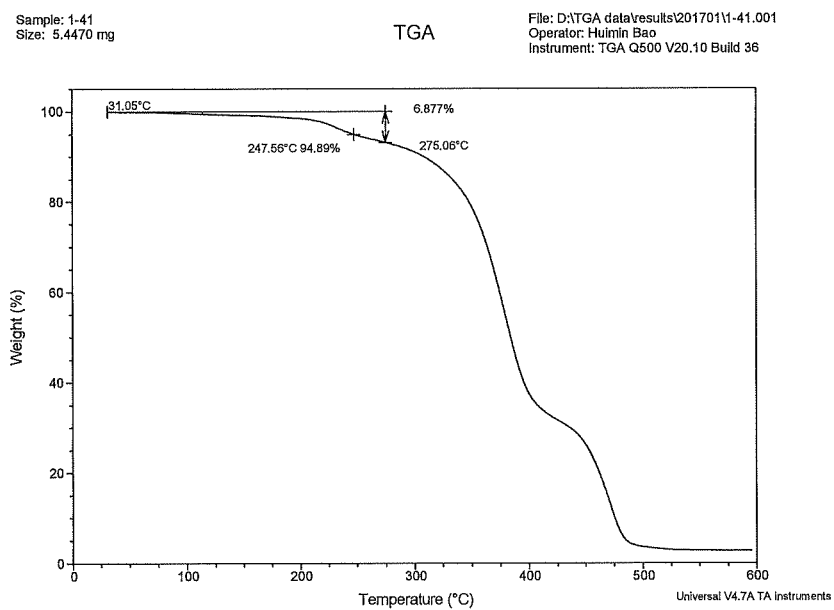
Fig. 4. TGA of copolymer 2

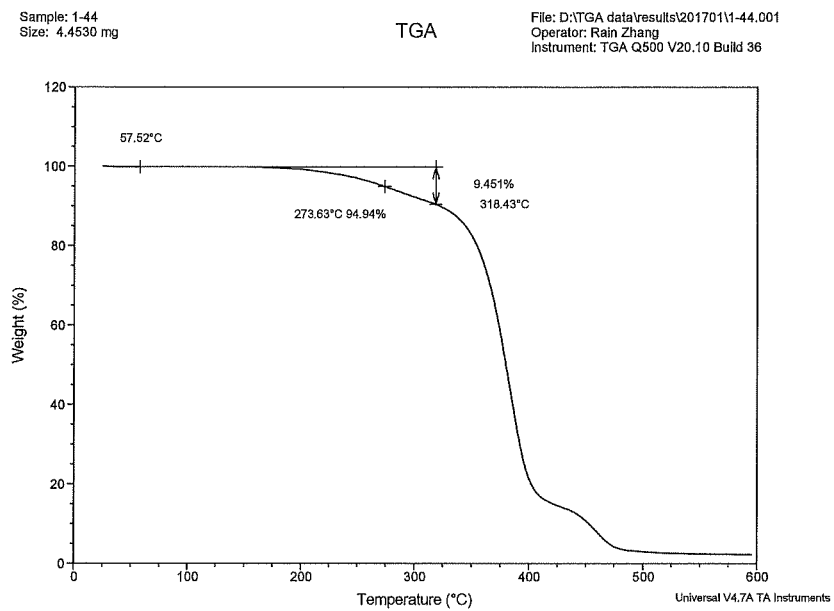
Fig. 5. TGA of copolymer 3
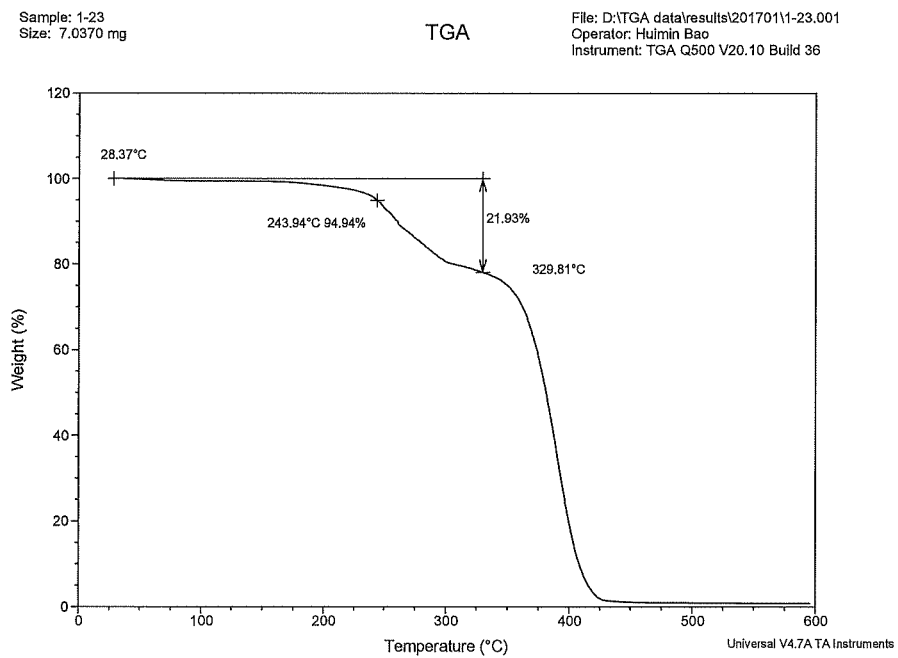
Fig. 6. TGA of PMMA (synthesized)

(METH)ACRYLATE FUNCTIONALIZED POLY(METH)ACRYLATE-BLOCK-POLYIMIDE-BLOCK-POLY(METH)ACRYLATE COPOLYMER, PREPARATION METHOD AND USE THEREOF

TECHNICAL FIELD

This invention relates to a (meth)acrylate-functionalized poly(meth)acrylate-block-polyimide-block-poly(meth)acrylate copolymer, preparation method and use thereof. The (meth)acrylate-functionalized poly(meth)acrylate-block-polyimide-block-poly(meth)acrylate copolymer according to the present invention exhibits outstanding thermal stability and excellent optical properties.

BACKGROUND OF THE INVENTION

Polyimides are known for their good thermal stability, chemical resistance and mechanical property, etc. However, applications of polyimides in adhesives have been limited due to their low solubility, poor compatibility with common components of adhesives, high melting point and extreme difficulty in processing.

Many studies have been conducted to modify the thermal and mechanical properties of polyimides. For example, Fu-Ming Wang, etc. synthesized poly(acrylate-co-imide)-based gel polymer electrolytes. See "The network gel polymer electrolyte based on poly(acrylate-co-imide) and its transport properties in lithium ion batteries", J Solid State Electrochem (2009) 13:1425-1431. Those poly(acrylate-co-imide)-based gel polymers are graft polymers. These grafted polymers are insoluble in most organic solvents. In addition, the bond between the imide moiety and the acrylate moiety is weak, which might impair the thermal stability of the graft polymer.

Notwithstanding the state of the art, there is an ongoing need for developing novel materials for adhesives that show both good thermal stability and good optical properties.

SUMMARY OF THE INVENTION

After intensive study, the inventors have developed a novel (meth)acrylate-functionalized poly(meth)acrylate-block-polyimide-block-poly(meth)acrylate copolymer represented by Formula I:

$R^5$ represents a divalent linking unit selected from $C_6$-$C_{30}$ cycloaliphatic groups and $C_6$-$C_{30}$ arylene groups; and A represents a tetravalent linking unit selected from $C_4$-$C_{14}$ aliphatic groups, $C_4$-$C_{30}$ cycloaliphatic groups, $C_6$-$C_{30}$ aryl groups, ether groups, sulfone groups, sulphide groups, amide groups and ester groups.

The present invention also relates to a method for preparing the copolymer according to the present invention.

The present invention also relates to a photo-curable adhesive composition comprising the copolymer according to the present invention.

The present invention also relates to use of the adhesive composition according to the present invention in bonding substrates.

BRIEF DESCRIPTION OF THE DRAWINGS

Additional features and advantages of the disclosure will be apparent from the detailed description which follows, taken in conjunction with the accompanying drawing, which together illustrate, by way of example, features of the technology; and, wherein:

FIGS. 3 to 5 each show the thermogravimetric analysis (TGA) curve of a copolymer prepared according to an Example of the present invention.

FIG. 6 shows the thermogravimetric analysis (TGA) curve of a copolymer prepared according to a Comparative Example.

Figure 1:
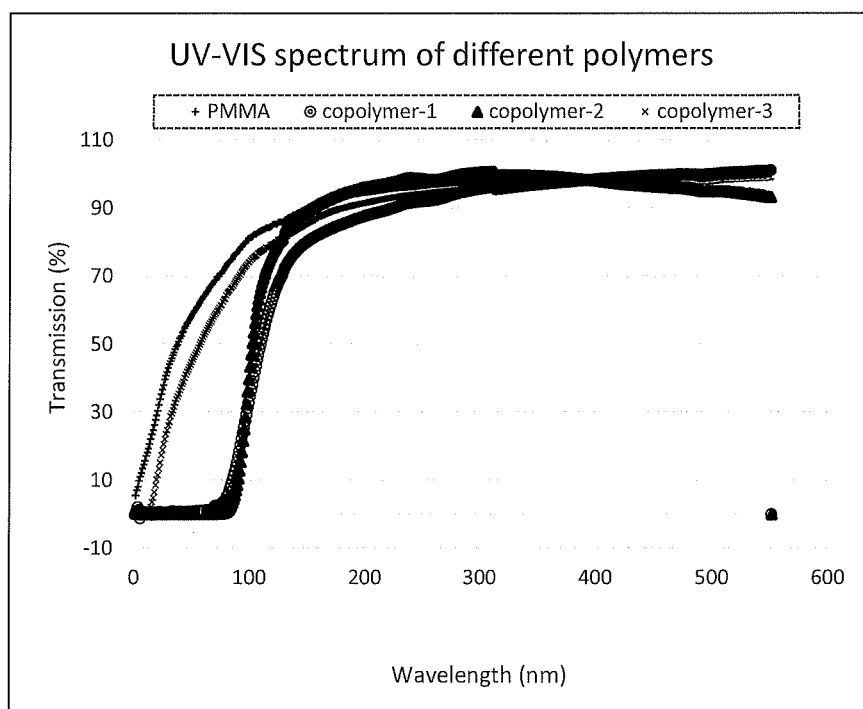
FIG. 1 compares the UV-VIS transmission-wavelength plots of copolymers prepared according to Examples of the present invention and a Comparative Example.

Reference will now be made to some illustrative examples, and specific language will be used herein to describe the same. It will nevertheless be understood that no limitation of the scope of the disclosure is thereby intended.

DETAILED DESCRIPTION OF THE DISCLOSURE

In the following passages the present disclosure is described in more detail. Each aspect so described may be combined with any other aspect or aspects unless clearly indicated to the contrary. In particular, any feature indicated

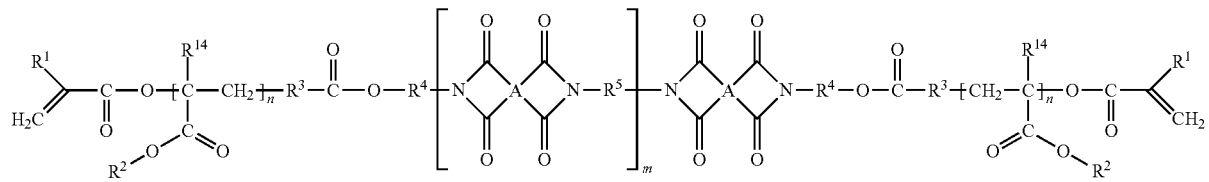

(I)

in formula (I), m and n each independently represent an integer from 1 to about 50, provided that m and n are not both 1 at the same time;

$R^1$ and $R^{14}$, identical or different from each other, are independently hydrogen or methyl;

$R^2$ is selected from $C_1$-$C_{12}$ alkyl groups;

$R^3$ is —CH($CH_3$)— or —C($CH_3$)$_2$—;

$R^4$ is selected from $C_1$-$C_{12}$ alkylene groups;

as being preferred or advantageous may be combined with any other feature or features indicated as being preferred or advantageous.

In the context of the present disclosure, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or process steps.

In the specification, the term "(meth)acrylate" refers to both or either of acrylate and methacrylate, the term "(meth) acrylic acid" represents both or either of acrylic acid and methacrylic acid, and the term "poly(meth)acrylate" represents both or either of polyacrylate and polymethacrylate.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosure, including technical and scientific terms, have the meanings as commonly understood by one of the ordinary skill in the art to which this disclosure belongs. By means of further guidance, term definitions are included to better appreciate the teaching of the present disclosure.

Unless specially indicated, all materials and agents used in the present disclosure are commercially available.

(Meth)acrylate-Functionalized poly(meth)acrylate-Block-polyimide-Block-poly(meth)acrylate copolymer In one aspect, the present invention provides a (meth)acrylate-functionalized poly(meth)acrylate-block-polyimide-block-poly(meth)acrylate copolymer represented by Formula I:

Not bound by any theory, it is believed that the polyimide block of the block copolymer according to the present invention imparts superior thermal stability to the (meth)acrylate-functionalized poly(meth)acrylate-block-polyimide-block-poly(meth)acrylate copolymer. By modifying polyimide blocks and end group with (meth)acrylate, the (meth)acrylate-functionalized poly(meth)acrylate-block-polyimide-block-poly(meth)acrylate copolymer further exhibits excellent optical properties. The (meth)acrylate block also imparts good flexibility to the copolymer, which in turn significantly improves the solubility, compatibility and processability of the copolymer. The term "aliphatic group", as used herein, means a linear or branched, substituted or unsubstituted hydrocarbon chain that is completely saturated or that contains one or more units of unsaturation, but which is not aromatic. Suitable aliphatic groups include, but are not limited to, linear or branched, substituted or unsubstituted alkyl, alkenyl and alkynyl groups. In some embodiments, aliphatic groups contains 1 to 20 carbon atoms. The aliphatic group may optionally be substituted, e.g. by halogen, alkyl, alkenyl, cycloalkyl, nitro, hydroxyl, amino, alkylamino, alkoxy, alkylthio or acyl.

The term "alkyl" refers to a saturated linear or branched, substituted or unsubstituted monovalent hydrocarbon radical, wherein the alkyl group may be optionally substituted, e.g. by halogen, alkyl, alkenyl, cycloalkyl, nitro, hydroxyl, amino, alkylamino, alkoxy, alkylthio or acyl. In some embodiments, alkyl groups have 1 to 20 carbon atoms, 1 to 12 carbon atoms, 1 to 6 carbon atoms. Some non-limiting examples of alkyl groups include methyl, ethyl, propyl, butyl, pentyl, hexyl, heptyl, octyl, nonyl, decyl and the like.

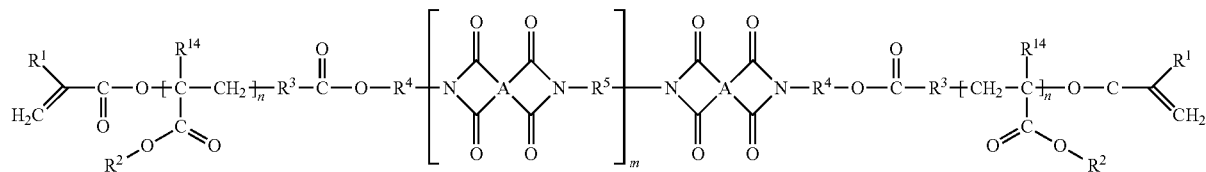

(I)

in formula (I), m and n each independently represent an integer from about 1 to about 50, provided that m and n are not both 1 at the same time;

$R^1$ and $R^{14}$, identical or different from each other, are independently hydrogen or methyl;

$R^2$ is selected from $C_1$-$C_{12}$ alkyl groups, $R^2$ is selected from $C_1$-$C_6$ alkyl groups;

$R^3$ is —CH(CH$_3$)— or —C(CH$_3$)$_2$—;

$R^4$ is selected from $C_1$-$C_{12}$ alkylene groups, $R^4$ is selected from $C_1$-$C_6$ alkylene groups;

$R^5$ represents a divalent linking unit selected from $C_6$-$C_{30}$ cycloaliphatic groups and $C_6$-$C_{30}$ arylene groups; and A represents a tetravalent linking unit selected from $C_4$-$C_{14}$ aliphatic groups, $C_4$-$C_{30}$ cycloaliphatic groups, $C_6$-$C_{30}$ aryl groups, ether groups, sulfone groups, sulphide groups, amide groups and ester groups.

It has been surprisingly found that the (meth)acrylate-functionalized poly(meth)acrylate-block-polyimide-block-poly(meth)acrylate copolymer according to the present invention exhibits outstanding thermal stability and excellent optical properties. In addition, the block copolymer is soluble in various solvents and monomers, easy to be processed, and compatible with common components of adhesives, such as (meth)acrylic resins.

The term "alkylene" refers to a saturated divalent hydrocarbon group derived from a linear or branched saturated hydrocarbon by removal of two hydrogen atoms, wherein the alkylene group may be optionally substituted, e.g. by halogen, alkyl, alkenyl, cycloalkyl, nitro, hydroxyl, amino, alkylamino, alkoxy, alkylthio or acyl. In some embodiments, alkylene groups have 1 to 20 carbon atoms, 1 to 12 carbon atoms, 1 to 6 carbon atoms. Some non-limiting examples of alkylene groups include methylene, ethylene, propylene, butylene, pentylene, hexylene, heptylene, octylene, nonylene, decylene and the like.

The term "alkenyl" refers to a linear or branched monovalent hydrocarbon radical with at least one site of a carbon-carbon unsaturated double bond, wherein the alkenyl group may be optionally substituted. In some embodiments, alkenyl groups have 2 to 20 carbon atoms, 2 to 12 carbon atoms, 2 to 6 carbon atoms. Non-limiting examples of suitable alkenyl groups include ethenyl, propenyl, butenyl, pentenyl, hexenyl, heptenyl, octenyl, nonenyl, decenyl, undecenyl, dodecenyl and the like.

The term "alkynyl" refers to a linear or branched monovalent hydrocarbon radical with at least one site of carbon-carbon unsaturated triple bond, wherein the alkynyl group may be optionally substituted. In some embodiments, alkynyl groups have 2 to 20 carbon atoms, 2 to 12 carbon atoms, 2 to 6 carbon atoms. Non-limiting examples of suitable alkynyl groups include ethynyl, propynyl, butynyl, pentynyl, hexynyl, heptynyl, octynyl, nonynyl, decynyl, undecynyl, dodecynyl and the like.

The term "cycloaliphatic" refers to a monovalent or multivalent non-aromatic, saturated or partially unsaturated ring in the form of a monocyclic or polycyclic (such as bicyclic, and tricyclic) ring system. Suitable cycloaliphatic groups include, but are not limited to, cycloalkyl, cycloalkenyl and cycloalkynyl. The cycloaliphatic group may optionally be substituted, e.g. by halogen, alkyl, alkenyl, cycloalkyl, nitro, hydroxyl, amino, alkylamino, alkoxy, alkylthio or acyl.

The term "cycloalkyl" refers to an optionally substituted saturated ring system of 3 to 30 ring carbon atoms, 4 to 30 ring carbon atoms. Exemplary monocyclic cycloalkyl group include cyclopropyl, cyclobutyl, cyclopentyl, cyclohexyl, cycloheptyl and the like.

As used herein, the term "cycloalkenyl" refers to a cyclic aliphatic hydrocarbon group having one or more carbon-carbon unsaturated double bonds. In one embodiment, a cycloalkenyl group has from 3 to 30 carbon atoms in the ring system, 4 to 30 ring carbon atoms.

As used herein, the term "cycloalkynyl" refers to a cyclic aliphatic hydrocarbon group having one or more carbon-carbon unsaturated triple bonds. In one embodiment, a cycloalkynyl group has from 3 to 30 carbon atoms in the ring system, 4 to 30 ring carbon atoms.

The term "aryl" refer to an optionally substituted $C_6$-$C_{30}$ aromatic hydrocarbon moiety comprising one to three aromatic rings. Specific examples of such groups include, but not limited to, phenyl, tolyl, xylyl and naphthyl, in particular phenyl or naphthyl. The aryl group may optionally be substituted, e.g. by halogen, alkyl, alkenyl, cycloalkyl, nitro, hydroxyl, amino, alkylamino, alkoxy, alkylthio or acyl.

The term "arylene", as used herein, represents an aryl system as described herein, but has two points of attachment to the rest of the molecule.

In some embodiments, A is selected from the following groups:

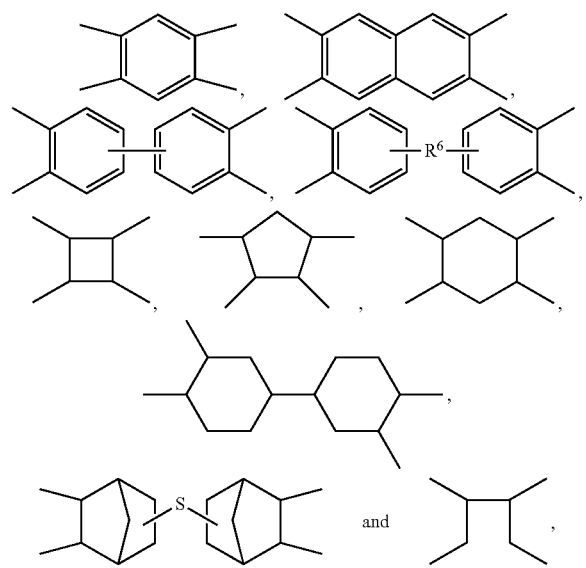

wherein $R^6$ is a divalent linking unit, $R^6$ is at the 3,3'-, 3,4'-, 4,3'- or 4,4'-positions of the benzene rings,
$R^6$ is selected from —O—, —S—, —C(O)—, —SO$_2$—, —SO—, $C_1$-$C_{20}$ alkylene groups, halogenated $C_1$-$C_{20}$) alkylene groups (including $C_1$-$C_{20}$ perfluoroalkylene groups) and groups represented by —O—Z—O—, wherein Z is a divalent linking group selected from the following groups:

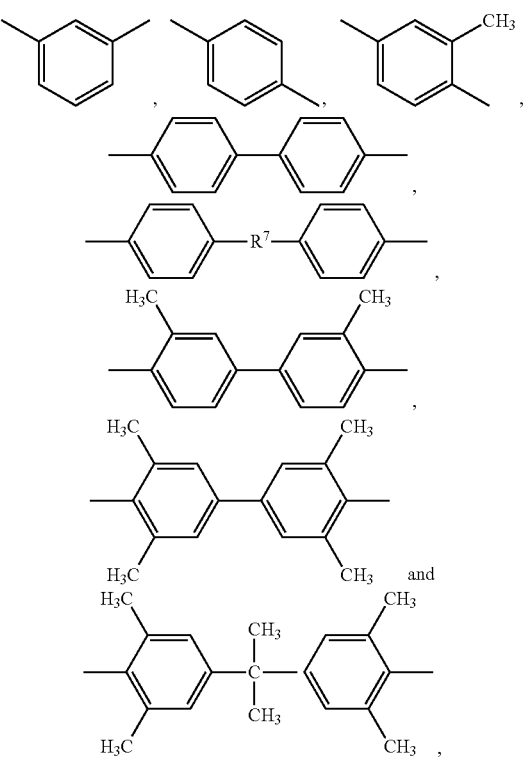

wherein $R^7$ is selected from —O—, —S—, —C(O)—, —SO$_2$—, —SO—, $C_1$-$C_{20}$ alkylene groups and halogenated $C_1$-$C_{20}$) alkylene groups (including $C_1$-$C_{20}$ perfluoroalkylene groups);
$R^6$ is selected from $C_1$-$C_{12}$ alkylene groups and halogenated $C_1$-$C_{12}$ alkylene groups, such as $C_1$-$C_{12}$ perfluoroalkylene groups.

As used herein, the term "halogenated" means fluorinated, chlorinated, brominated, iodinated or any combination thereof.

In some embodiments, $R^5$ is selected from the following groups:

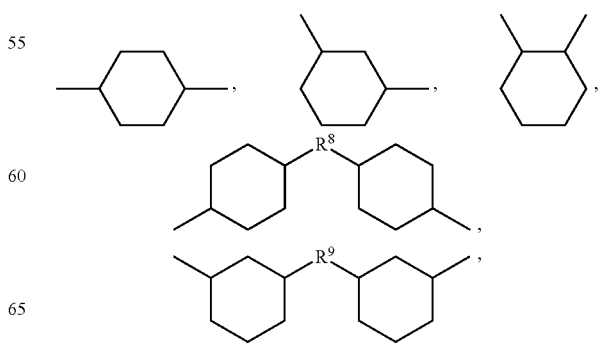

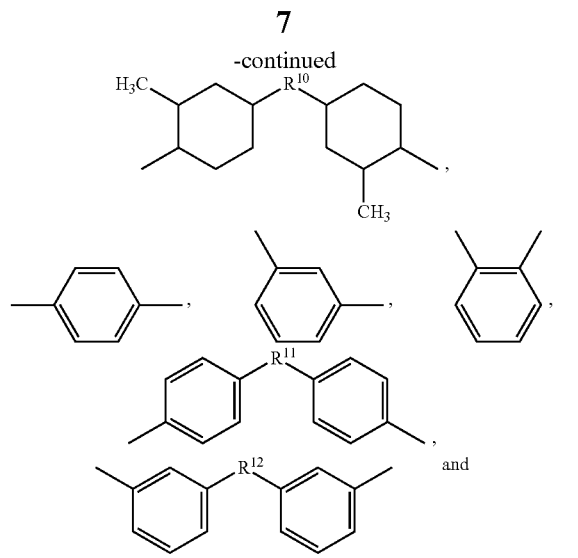

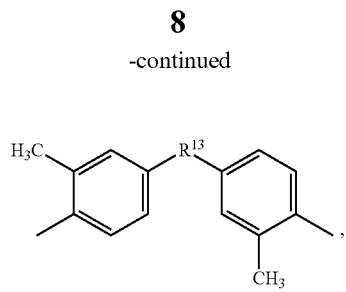

wherein $R^8$ to $R^{13}$ are each independently selected from $C_1$-$C_{20}$) alkylene groups and halogenated derivatives thereof, including $C_1$-$C_{20}$ perfluoroalkylene groups; $C_1$-$C_{12}$ alkylene groups and halogenated derivatives thereof, such as $C_1$-$C_{12}$ perfluoroalkylene groups.

In some examples, the block copolymer according to the present invention is represented by any one of Formula II to Formula IV:

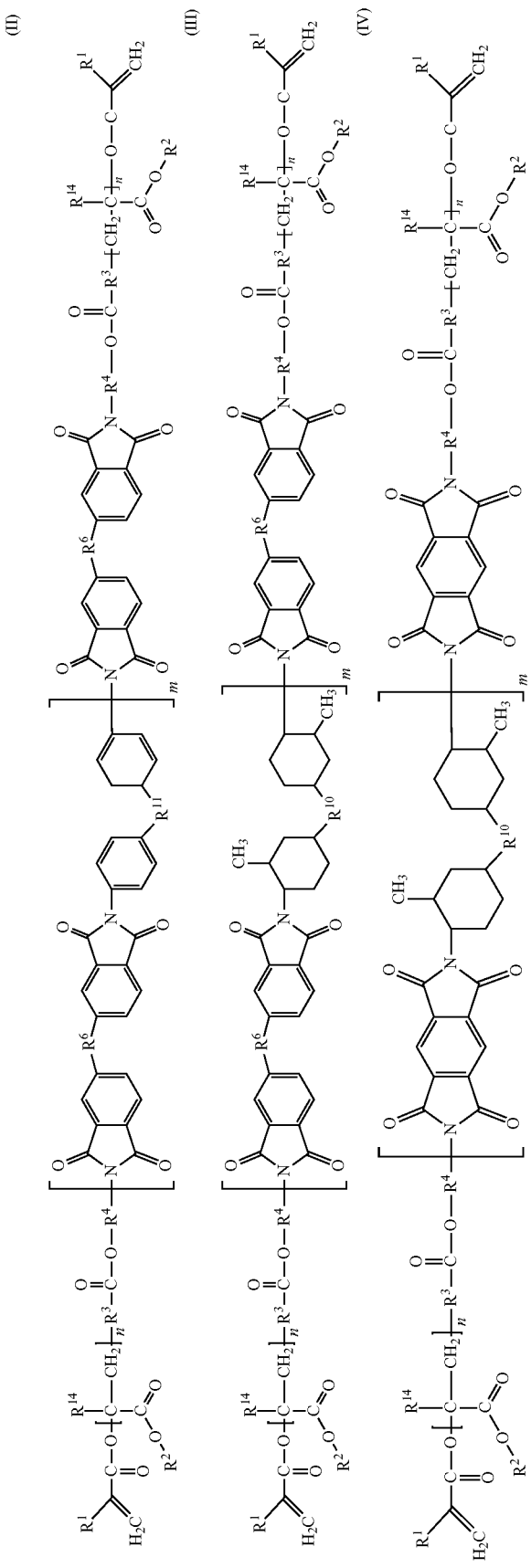

wherein $R^1$ to $R^4$, $R^6$, $R^{10}$, $R^{11}$, $R^{14}$, m and n are each as defined above for Formula I.

In some embodiments, $R^4$ is $C_1$-$C_{12}$, $C_1$-$C_6$ alkylene group, n-hexylene group (—$(CH_2)_6$—). In some embodiments, $R^6$ and $R^{11}$ are each independently $C_1$-$C_{20}$), $C_1$-$C_{12}$ perfluoroalkylene groups, hexafluoroisopropylene group (—$C(CF_3)_2$—). In some embodiments, $R^{10}$ is $C_1$-$C_{12}$, $C_1$-$C_6$ alkylene group, methylene group (—$CH_2$—).

In some embodiments, the block copolymer according to the present invention has a number average molecular weight (Mn) from about 2,000 to about 1,000,000 Daltons as measured by GPC, from about 10,000 to about 500,000 Daltons, about 15,000 to about 300,000 Daltons.

In some embodiments, the block copolymer according to the present invention has a polydispersity index (PDI) from about 1.1 to about 2.0, from about 1.2 to about 1.6.

In some embodiments, the block copolymer according to the present invention is in the form of solid powders or a bulk solid. In some embodiments, the copolymer is in white color.

In some embodiments, the functionality of the block copolymer is from about 1.0 to about 2.0. The functionality of the copolymer means the number of unsaturated double bonds in the backbone of the block copolymer.

Preparation Method of the (meth)acylate-Functionalized poly(meth)acrylate-Block-polyimide-Block-poly(meth)acrylate copolymer In another aspect, the present invention provides a method for preparing the (meth)acrylate-functionalized poly(meth)acrylate-block-polyimide-block-poly(meth)acrylate copolymer according to the present invention, comprising:
reacting a diamine, a dianhydride and a monoamine to form a polyamic acid according to scheme 1;

Scheme 1

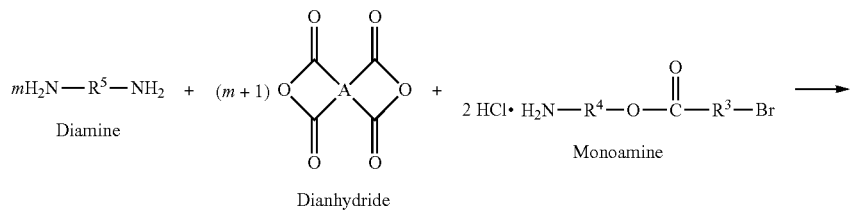

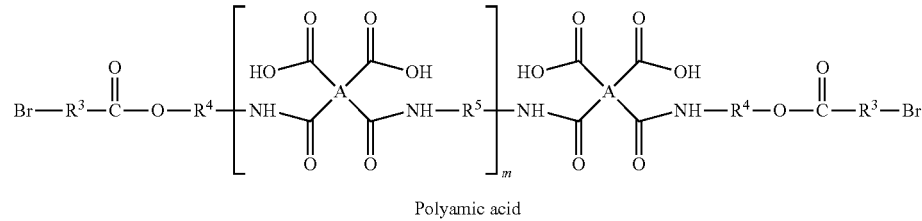

Polyamic acid dehydrating the polyamic acid to form a polyimide;
reacting the polyimide and a (meth)acrylate to form a bromine-terminated poly(meth)acrylate-block-polyimide-block-poly(meth)acrylate copolymer represented by formula V;

(V)

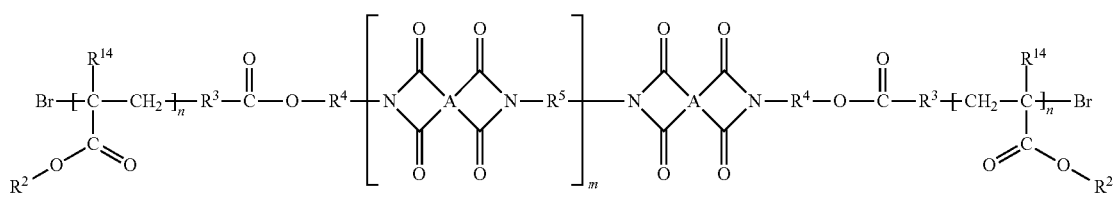

and
reacting the bromine-terminated poly(meth)acrylate-block-polyimide-block-poly(meth)acrylate copolymer with (meth)acrylic acid to form the (meth)acrylate-functionalized poly(meth)acrylate-block-polyimide-block-poly(meth)acrylate copolymer represented by Formula I, wherein $R^1$ to $R^5$, $R^{14}$, A, m and n each have the same definitions and preferable ranges as those described for Formula I.

In some embodiments, the (meth)acrylate-functionalized poly(meth)acrylate-block-polyimide-block-poly(meth)acrylate copolymer is synthesized by single electron transfer-living radical polymerization (SET-LRP reaction). By adjusting the feeding ratio of the dianhydride monomer to the (meth)acrylate monomer, the number ratio of polyimide block to poly(meth)acrylate block and the chain length of the whole copolymer is controllable. Besides, by the SET-LRP reaction, the PDI of the poly(meth)acrylate moiety in the (meth)acrylate-functionalized poly(meth)acrylate-block-polyimide-block-poly(meth)acrylate copolymer could be precisely controlled to about 1.01 to about 1.2, from about 1.05 to about 1.1.

Photo-Curable Adhesive Composition

In another aspect, the present invention provides a photo-curable adhesive composition comprising the copolymer according to the present invention, wherein the adhesive composition is a liquid optically clear adhesive composition.

In addition to the (meth)acrylate-functionalized poly(meth)acrylate-block-polyimide-block-poly(meth)acrylate copolymer, the adhesive composition further comprises a (meth)acrylate monomer and/or a photo initiator.

In some embodiments, the (meth)acrylate monomer is mono-functional or di-functional.

In some embodiments, the (meth)acrylate monomers include, but are not limited to, 2-hydroxyethyl acrylate, 2-hydroxypropyl(meth)acrylate, 4-hydroxybutyl(meth)acrylate, 2-hydroxybutyl (meth)acrylate, isobutyl (meth)acrylate, t-butyl (meth)acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, menubutoxy ethylene glycol (meth)acrylate, 2-ethoxyethyl (meth)acrylate, tetrahydrofurfuryl (meth)acrylate, benzyl (meth)acrylate, ethyl carbitol (meth)acrylate, phenoxyethyl (meth)acrylate, carboxymethyl diethylene glycol (meth)acrylate, phenoxy polyethylene glycol (meth)acrylate, methoxypolyethylene glycol (meth)acrylate, 2,2,2,-trifluoroethyl (meth)acrylate, 2,2,3,3,-tetrafuruo (meth)acrylate, 1H,1H,5H-octafluoropentyl (meth)acrylate, imide (meth)acrylate, methyl (meth)acrylate, ethyl (meth)acrylate, propyl (meth)acrylate, n-butyl (meth)acrylate, cyclohexyl (meth)acrylate, 2-ethylhexyl (meth)acrylate, n-octyl (meth)acrylate, isononyl (meth)acrylate, isomyristyl (meth)acrylate, 2-butoxyethyl (meth)acrylate, 2-phenoxyethyl (meth)acrylate, bicyclopentenyl (meth)acrylate, isodecyl (meth)acrylate, diethylaminoethyl (meth)acrylate, dimethylaminoethyl (meth)acrylate, 2-(meth)acryloyloxyethyl hexahydrophthalic acid, 2-(meth)acryloyloxyethyl 2-hydroxypropyl phthalate, glycidyl (meth)acrylate, 2-(meth)acryloyloxyethyl phosphate, 1,4-butanediol di(meth)acrylate, 1,3-butanediol di(meth)acrylate, 1,6-hexanediol di(meth)acrylate, 1,9-nonanediol di(meth)acrylate, 1,10-decanediol di(meth)acrylate, 2-n-butyl-2-ethyl-1,3-propanediol di(meth)acrylate, dipropylene glycol di(meth)acrylate, tripropylene glycol di(meth)acrylate, polypropylene glycidyl (meth)acrylate, ethylene glycol di(meth)acrylate, diethyleneglycol di(meth)acrylate, tetraethylene glycol di(meth)acrylate, polyethylene glycol di(meth)acrylate, propylene oxide addition bisphenol A di(meth)acrylate, ethylene oxide addition bisphenol A di(meth)acrylate, ethylene oxide addition bisphenol F di(meth)acrylate, cyclopentadiene distearate(meth)acrylate, 1,3-butylene glycol di(meth)acrylate, neopentyl glycol di(meth)acrylate, ethylene oxide modified isocyanuric acid di(meth)acrylate, carbonate diol di(meth)acrylate, and the like. Examples of commercially available (meth)acrylate monomers include, for example, EB230, EB264, EB265, EB284, EB280, EB1290, EB270, EB4833, EB8210, EB8402, EB8808 (aliphatic urethane acrylate), EB220, EB4827, EB4849 (aromatic urethane acrylate), EB657, EB885, EB600, EB3200, EB3700, EB3702, EB3703, EB3720 (Daicel Cytec Co., Ltd.); CN8000NS, CN8001NS, CN8003, CN9001NS, CN9002, CN9014NS, CN991NS (urethane acrylate), CN146, CN2203NS, CN2254NS, CN2261, CN2302, CN293, CN3108, CN704, CN8200 (polyester acrylate), CN104NS, CN120NS, CN131NS, CN2003NS, CN159 (epoxy acrylate, available from Sartomer) etc.

In some embodiments, the photo initiator is selected from benzoin ether photoinitiators, benzil ketal photoinitiators, acetophenone photoinitiators, anthraquinone photoinitiators, thioxanthone photoinitiators, benzophenone photoinitiators, acyl phosphine oxide photoinitiators, benzoate photoinitiators and any combination thereof.

In some embodiments, the adhesive composition further comprises optional additives. There is no specific limitation to other optional additives that may be contained in the composition, those commonly used in adhesives may be used. In some embodiments, other optional additives may include, but not limited to, thermoplastic polymers, organic or inorganic fillers, thixotropic agents, silane coupling agents, diluents, modifiers, coloring agents such as pigments and dyes, surfactants, preservatives, stabilizers, plasticizers, lubricants, defoamers, leveling agents and the like. In particular, the adhesive composition comprises organic or inorganic fillers and/or a thixotropic agent.

The filler includes, but are not limited to, inorganic fillers such as silica, diatomaceous earth, alumina, zinc oxide, iron oxide, magnesium oxide, tin oxide, titanium oxide, magnesium hydroxide, aluminium hydroxide, magnesium carbonate, barium sulphate, gypsum, calcium silicate, talc, glass bead, sericite activated white earth, bentonite, aluminum nitride, silicon nitride and the like; and organic fillers such as polymethyl methacrylate, polyethyl methacrylate, polypropyl methacrylate, polybutyl methacrylate, butylacrylate-methacrylic acid-methyl methacrylate copolymer, poly acrylonitrile, polystyrene, polybutadiene, polypentadiene, polyisoprene, polyisopropylene and the like. These may be used alone or in combination thereof.

The thixotropic agent includes, but not limited to, talc, fume silica, superfine surface-treated calcium carbonate, fine particle alumina, plate-like alumina; layered compound such as montmorillonite, spicular compound such as aluminium borate whisker and the like. Among them, talc, fume silica and fine particle alumina are preferred.

In another aspect, the present invention provides use of the adhesive composition according to the present invention in bonding substrates, wherein the substrates are glasses or transparent plastics.

In some embodiments, the method of bonding substrates comprises:
  applying the adhesive composition of the present invention onto the surface of one substrate;
  bringing the substrate with the adhesive composition applied thereon into contact with another substrate; and
  exposing the bonded substrates to actinic radiation.

The adhesive composition may be cured upon exposure to actinic radiation, such as ultraviolet, visible light or black light radiation. In one preferred embodiment, an ultraviolet radiation having a wavelength of about 200 to about 450 nm, about 300 to about 450 nm is used to cure the composition.

In another preferred embodiment, the ultraviolet radiation applied to the composition has radiation energy of about 100 mJ/cm² to about 10,000 mJ/cm², about 500 mJ/cm² to about 5,000 mJ/cm². It is preferable for the radiation source to be substantially perpendicular to the substrate during curing.

EXAMPLES

The following examples are intended to assist one skilled in the art to better understand and practice the present disclosure. The scope of the disclosure is not limited by the examples but is defined in the appended claims.

Example 1 (Ex. 1)

Synthesis of Hydrochloride Salt of 2-bromo-2-methyl-propionic acid 6-amino-hexyl ester

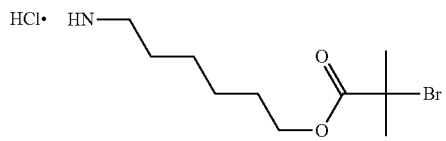

Hydrochloride Salt of 2-bromo-2-methyl-propionic acid 6-amino-hexyl ester 6-hydroxy hexan-1-ammonium chloride (1.4 g, 13.7 mmol) was dissolved in 10 mL anhydrous acetone in a 100 mL 3-neck round bottom flask at room temperature, to which a solution of 2-bromoisobutyryl bromide (1.7 mL, 13.7 mmol) in 10 mL acetone was added dropwise. After stirring the mixture for 5 h, the solvent was removed from the mixture by rotary evaporator. The resultant product was precipitated in cold diethylether and filtered. Then, it was dried in vacuo at room temperature (2.07 g, 50% yield).

$^1$H NMR (CDCl$_3$, 300 MHz): 7.99 [s, 3H, NH$_3$], 4.178 (t, 2H, CH$_2$O), 3.08 (m, 2H, CH$_2$N), 1.79 [s, 6H, (CH$_3$)$_2$], 1.74 (m, 2H, CH$_2$), 1.74 (quintet, 2H, CH$_2$), 1.68 [m, 4H, (CH$_2$)$_2$]

Synthesis of Polyamic Acid 1

Polyimic·acid·1

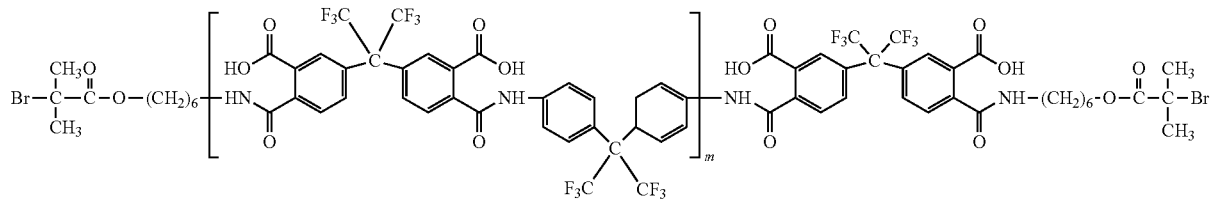

2,2-bis(4-aminophenyl)hexafluoropropane (6.68 g, 20 mmol), hydrochloride salt of 2-bromo-2-methyl-propionic acid 6-amino-hexyl ester (0.60 g, 2 mmol) were dissolved in 150 mL N-methyl-2-pyrrolidone (NMP) in a 500 mL 3-neck round bottom flask at room temperature. Subsequently, 4,4' (hexafluoroisopropylidene) diphthalic anhydride (9.05 g, 2.04 mmol) in 100 mL NMP was dropwise added to the round bottom flask over about 0.5 h. After the anhydride was completely added, the temperature was raised to 80° C. Then a mixture containing polyamic acid 1 was obtained.

Synthesis of Polyamide 1

Polyamide 1

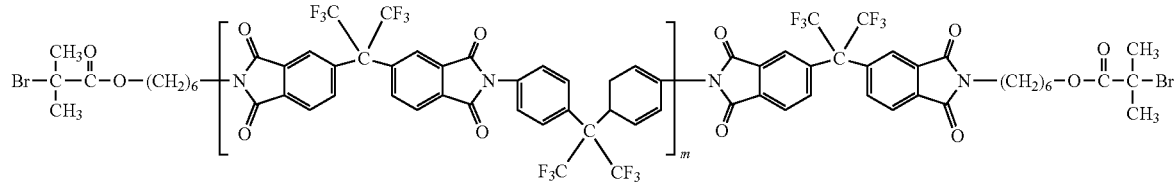

Acetic anhydride (Ac$_2$O, 7.55 mL, 80 mmol) and triethylamine (TEA, 11 mL, 80 mmol) were added dropwise to the 500 mL 3-neck round bottom flask containing polyamic acid 1 over about 1 hour. Then the reaction lasted for 6 hours, during which the temperature went down to room temperature. The solution was poured into 1 L icy water, with white solid being precipitated. Then the white solid was washed with EtOH/H$_2$O (1:3, volume ratio) for three times and dried in a vacuum oven (LS-V050, Labserv). Then 14.03 g polyimide 1 was obtained. The number average molecule weight (Mn) of polyimide 1 as measured by GPC was 5,400 Da, and the polydispersity index (PDI) as measured by GPC (Waters, 1515) was 1.2.

IR (cm$^{-1}$): 2957(w), 2928(w), 1788(w), 1722(vs), 1608 (w), 1508(m), 1373(vs), 1254(s) 1208(s), 1175(vs).

Synthesis of Bromine-Terminated Block Copolymer 1

H$_2$O at room temperature to obtain a product in the form of white powders. Ion chromatography test (Varian 710-OES) showed that the functionality (double bond) was 1.6 in the product. The polydispersity index (PDI) as measured by GPC (Waters, 1515) was 1.3, and Mn was 250,000 Da.

Example 2

Synthesis of Polyimide 2

4,4'-Methylenebis(2-methylcyclohexylamine) (4.76 g, 20 mmol), hydrochloride salt of 2-bromo-2-methyl-propionic acid 6-amino-hexyl ester (0.60 g, 2 mmol) were dissolved in 150 mL NMP in a 500 mL round bottle. 4,4' (Hexafluoroisopropylidene) diphthalic anhydride (9.05 g, 20 mmol), triethylamine (0.1 mL) in 100 mL NMP was added to the

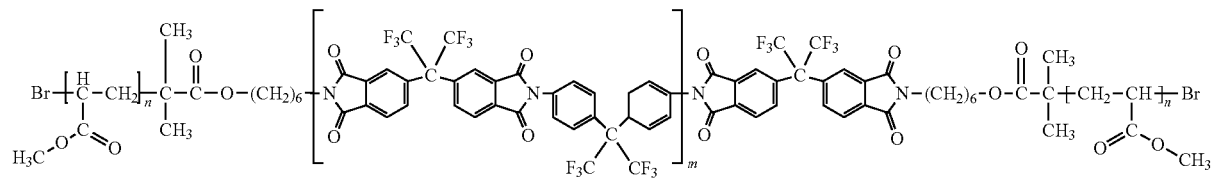

Bromine-terminated block copolymer 1

At room temperature, polyimide 1 (2.0 g) as obtained was dissolved in 20 mL dimethyl sulfoxide (DMSO) in a 250 mL 3-neck round bottom flask. Cu mesh (0.2 g), 40 mL methyl methacrylate (MMA), 20 mL tetrahydrofuran (THF) were added to the 3-neck round bottom flask. Then nitrogen purge was introduced into the 3-neck round bottom flask to displace the oxygen therein. Then 2,2'-Dipyridyl (0.1 g, aldrich) was added to the 3-neck round bottom flask and the reaction was carried out at 60° C. for 5 hours. The viscosity of the solution in the flask was greatly increased. After the reaction finished, the solution was precipitated in MeOH to obtain a product in white solid powders which was bromine-terminated block copolymer 1 (Mn=250,000 Da, PDI=1.3, GPC, Waters, 1515).

$^1$H-NMR (CDCl$_3$): 8.07 (1H), 8.00 (1H), 7.89 (1H), 7.58 (2H), 7.53 (2H), 3.60 (33H), 2.06-1.81 (20H), 1.59 (4H), 1.43 (2H), 1.01 (11H), 0.84 (21H).

Synthesis of Acrylate-Functionalized Block Copolymer 1 reaction system over about 0.5 h. The reaction was carried out at room temperature. After the anhydride was completely added, the temperature was raised to 80° C. And the reaction lasted for another 3 hours. Then Ac$_2$O (7.55 mL, 80 mmol) and TEA (11 mL, 80 mmol) was added to the system dropwise for about 1 hour. The reaction was lasted for 6 hours and the temperature decreased to room temperature. The solution was poured to 1 L icy water. The obtained white solid was precipitated. It was then washed with EtOH/H$_2$O (1:3) for three times and the final product (polyimide 2) was obtained after dried in the vacuum oven. The molecule weight (Mn) as measured by GPC was 5,800 Da, PDI was 1.26.

Synthesis of Bromine-Terminated Block Copolymer 2

Polyimide 2 (2.0 g) was dissolved in 20 mL DMSO in a 250 mL bottle. Cu mesh (0.2 g), 10 mL MMA, 20 mL THF were added to the system. Then N$_2$ was purged into the

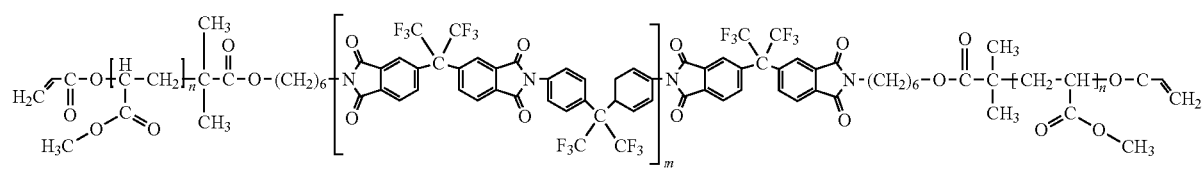

Acrylate-functionalized block copolymer 1

Bromine-terminated block copolymer 1 (2.0 g), K$_2$CO$_3$ (0.5 g, 3.6 mmol), acrylic acid (0.25 g 3.4 mmol) and TBAB (0.1 g, 0.3 mmol) was dissolved in 100 mL acetonitrile in a 250 mL 3-neck round bottom flask. The reaction took place at 70° C. for 8 hours under the protection of N$_2$. After the reaction finished, the solution was precipitated in 100 mL system to avoid the inhibition of O2. Then the 2,2'-Dipyridyl (0.1 g) was added to the solution and the reaction was carried out at 60° C. for 5 hours. After the reaction finished, the solution was precipitated in MeOH to obtain the resin as bromine-terminated block copolymer 2. GPC showed that the molecule weight (Mn) was about 138,000 Da.

Synthesis of Acrylate-Functionalized Block
Copolymer 2

*[Chemical structure diagram: Acrylate-functionalized block copolymer 2]*

Block copolymer 2 was prepared in the same way as described above for Example 1, except that bromine-terminated block copolymer 2 was used instead of bromine-terminated block copolymer 1.

The polymer showed a molecule weight 138,000 Daltons, PDI was 1.6 (Waters, 1515). And the functionality was about 1.6.

Example 3

Synthesis of Polyimide 3

4,4'-Methylenebis(2-methylcyclohexylamine) (9.52 g, 40 mmol), hydrochloride salt of 2-bromo-2-methyl-propionic acid 6-amino-hexyl ester (1.20 g, 4 mmol) were dissolved in 150 mL NMP in a 500 mL round bottle. 1,2,4,5-Cyclohexanetetracarboxylic Dianhydride (9.13 g, 40 mmol), TEA (0.1 mL) in 100 mL NMP was added to the reaction system over about 0.5 h. The reaction was carried out at 80° C. After the anhydride was completely added, the reaction lasted for another 3 hours. Then $Ac_2O$ (15.1 mL, 160 mmol) and TEA (22 mL, 160 mmol) was added to the system dropwise for about 1 hour. The reaction was carried out for another 6 hours. Then the solution was poured into 2 L icy water. A white solid was precipitated. It was then washed with $EtOH/H_2O$ (1:3) for three times and a product (polyimide 3) was obtained after dried in the vacuum oven.

Synthesis of Bromine-Terminated Block Copolymer 3

Polyimide 3 (2.0 g) was dissolved in 20 mL DMSO in a 250 mL bottle. Cu mesh (0.2 g), 20 mL MMA, 20 mL THF were added to the system. Then $N_2$ was purged into the system to avoid the inhibition of O2. Then the 2,2'-Dipyridyl (0.1 g) was added to the solution and the reaction was carried out at 60° C. for 5 hours. After the reaction finished, the solution was diluted by dichloromethane (200 mL). Then 100 mL water was added, and the organic layer was concentrated to obtain a resin as bromine-terminated block copolymer 3 (Mn=16,500 Da, PDI=1.5).

Synthesis of Acrylate-Functionalized Block
Copolymer 3

*[Chemical structure diagram: Acrylate-functionalized block copolymer 3]*

Block copolymer 3 was prepared in the same way as described above for Example 1, except that bromine-terminated block copolymer 3 was used instead of bromine-terminated block copolymer 1.

The functionality was about 1.6, Mn=16,500 Da, PDI=1.5.

Property Measurements

Examples 4-13

Solubility Test of Acrylate-Functionalized Block Copolymer 1

Acrylate-functionalized block copolymer 1 (unit: mg) was mixed with the acrylate monomers and/or oligomers (unit: mg) listed below. Then the mixture was stirred with a speedmixer (Flacktek, DAC150, 2500 rpm) for 3 mins. The obtained mixture were observed by naked eyes to see whether a clear solution was formed, or separated phases or a dispersion was undesirably formed.

| | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|
| copolymer1 | 60 | 60 | 60 | 200 | 200 | 60 | 60 | 60 | 40 | 40 |
| lauryl acrylate | 130 | 130 | 130 | | | | | | | |

-continued

|  | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|
| urethane acrylate 13-275[1] |  | 180 | 360 |  |  |  |  |  |  | 100 |
| polyethylene glycol-diacrylate[2] |  |  |  | 600 | 360 |  |  |  |  |  |
| Methoxyethyl Methacrylate[3] |  |  |  |  |  | 180 | 200 | 60 |  |  |
| 2-hydroxyethyl Acrylate[4] |  |  |  |  |  |  |  | 150 | 200 | 200 |
| Whether a solution is formed | yes | yes | yes | yes | yes | yes | yes | yes | yes | yes |

Note:
[1]Urethane acrylate 13-275 is available from Sartomer;
[2]Polyethylene glycol-diacrylate is available from Sartomer;
[3]Methoxyethyl Methacrylate is available from KPX; and
[4]2-Hydroxyethyl Acrylate is available from Aldrich.

It can be seen from the table above that the acrylate-functionalized block copolymer 1 could be soluble in various (meth)acrylate monomers and their mixtures.

Example 14

Light Transmittance Test of Acrylate-Functionalized Block Copolymers 1-3 and a Reference Sample At room temperature, hydrochloride salt of 2-bromo-2-methyl-propionic acid 6-amino-hexyl ester (0.2 g) was dissolved in 20 mL dimethyl sulfoxide (DMSO) in a 250 mL 3-neck round bottom flask. Cu mesh (0.2 g), 40 mL methyl methacrylate (MMA) and 20 mL tetrahydrofuran (THF) were added to the 3-neck round bottom flask. Then nitrogen purge was introduced into the 3-neck round bottom flask to displace the oxygen therein. Then 2,2'-dipyridyl (0.1, Aldrich) was added to the 3-neck round bottom flask and the reaction was carried out at 60° C. for 5 hours. The viscosity of the solution in the flask was greatly increased. After the reaction finished, the solution was precipitated in MeOH to obtain a white solid product which was polymethyl methacrylate PMMA (Mn=150,000 Da, PDI=1.1, GPC, Waters, 1515). $^1$H-NMR (CDCl$_3$): 3.60 (s, 3H), 2.06-1.81 (m, 2H), 1.01 (s, 1H), 0.84 (s, 2H).

The acrylate-functionalized block copolymers 1-3 and the aforementioned PMMA were dissolved in THF (10 mg/mL), respectively. FIG. 1 shows the UV-Vis transmission-wavelength plots collected with L-650 (available from Perkin Elmer).

It can be seen from FIG. 1 that in the near visible region, methacrylate-functionalized block copolymers 1-3 according to the present invention showed high light transmittances, which were almost the same as the light transmittance of polymethyl methacrylate.

Example 15

Thermal Stability Test of Acrylate-Functionalized Block Copolymers 1-3 and a Reference Sample The thermal stabilities of acrylate-functionalized block copolymers 1-3 (10 g) and the aforementioned PMMA (10 g) were tested in Q500 (available from TA). Nitrogen gas was introduced into the Q500. The temperature in the Q500 was elevated at a rate of 10° C./min.

Figure 2:
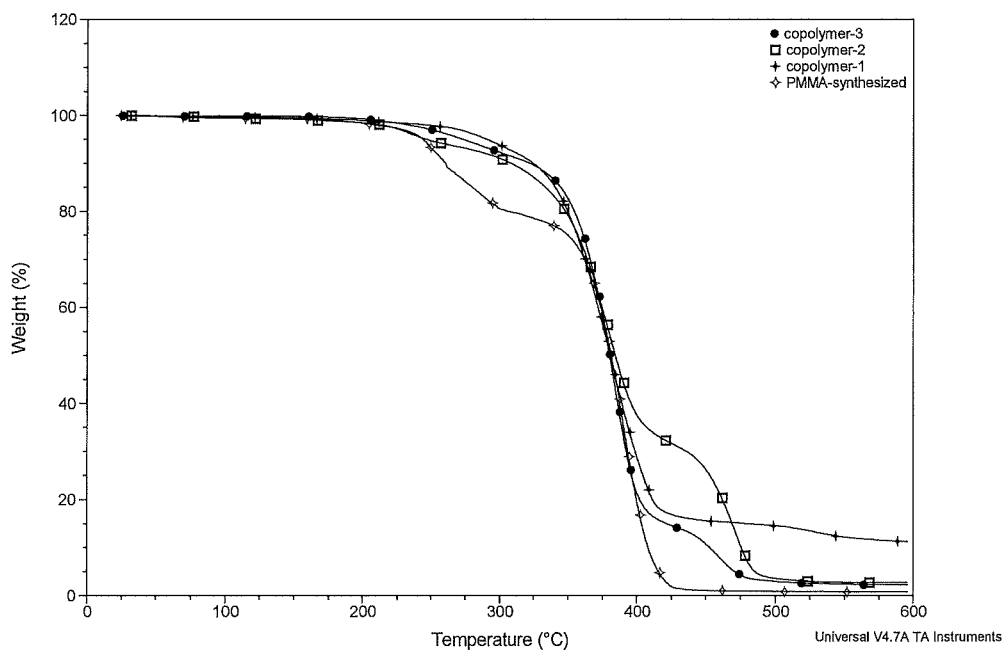
FIG. 2 compares the thermogravimetric analysis (TGA) curves of copolymers prepared according to Examples of the present invention and a Comparative Example.

FIG. 2 combines the thermogravimetric analysis (TGA) curves of acrylate-functionalized block copolymers 1-3 and the aforementioned PMMA. FIGS. 3-6 each shows the thermogravimetric analysis (TGA) curves of acrylate-functionalized block copolymers 1, 2, 3 and polymethyl methacrylate.

It can be seen from FIGS. 2-6 that the acrylate-functionalized block copolymers 1-3 exhibited better thermal stabilities than polymethyl methacrylate. The Td5 temperatures (the temperature of 5 wt % decomposition) of copolymer 1 and copolymer 3 were higher than the Td5 temperature of PMMA. In the first stage, PMMA dramatically decomposed, and reached 21.93 wt % decomposition at 329.81° C. In contrast, the acrylate-functionalized block copolymers 1-3 according to the present invention were much more stable in the first stage.

The invention claimed is:
1. A (meth)acrylate-functionalized block-copolymer represented by Formula I:

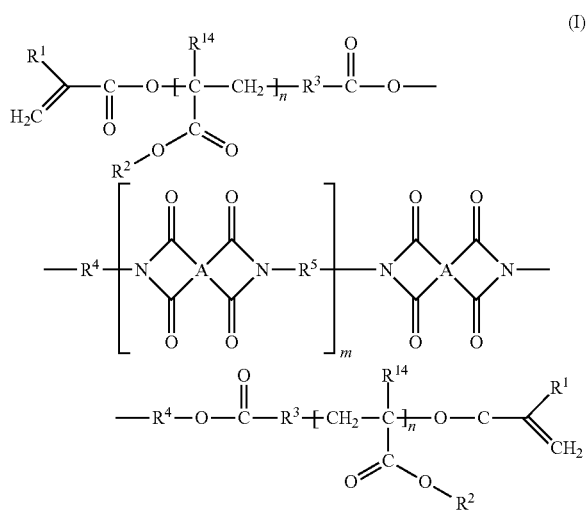

wherein m and n each independently represent an integer from about 1 to about 50, provided that m and n are not both 1 at the same time;

each $R^1$ and $R^{14}$ is independently selected from hydrogen or methyl;
each $R^2$ is independently selected from a $C_1$-$C_{12}$ alkyl group;
each $R^3$ is independently selected from —CH(CH$_3$)— or —C(CH$_3$)$_2$—;
each $R^4$ is independently selected from a $C_1$-$C_{12}$ alkylene group;
$R^5$ is a divalent linking unit selected from a $C_6$-$C_{30}$ cycloaliphatic group or a $C_6$-$C_{30}$ arylene group; and
each A is a tetravalent linking unit independently selected from a $C_4$-$C_{14}$ aliphatic group, a $C_4$-$C_{30}$ cycloaliphatic group, a $C_6$-$C_{30}$ aryl group, an ether group, a sulfone group, a sulphide group, an amide group and an ester group.

2. The copolymer according to claim 1, wherein each $R^2$ is independently selected from a $C_1$-$C_6$ alkyl group.

3. The copolymer according to claim 1, wherein each $R^4$ is independently selected from a $C_1$-$C_6$ alkylene group.

4. The copolymer according to claim 1, wherein each A is independently selected from the following groups:

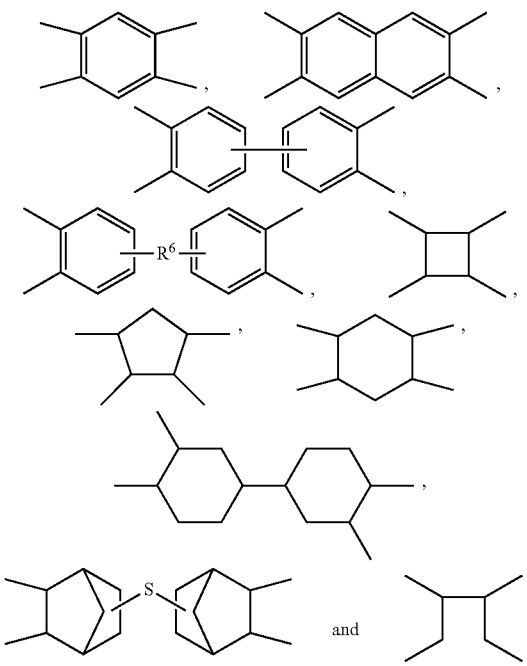

wherein $R^6$ is a divalent linking unit and $R^6$ is at the 3,3'-, 3,4'-, 4,3'- or 4,4'-positions of the benzene rings,
$R^6$ is selected from —O—, —S—, —C(O)—, —SO$_2$—, —SO—, $C_1$-$C_{20}$ alkylene group, halogenated $C_1$-$C_{20}$ alkylene group, $C_1$-$C_{20}$ perfluoroalkylene group and groups represented by —O—Z—O—, wherein Z is a divalent linking group selected from the following groups:

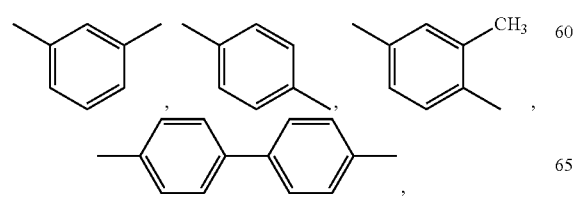

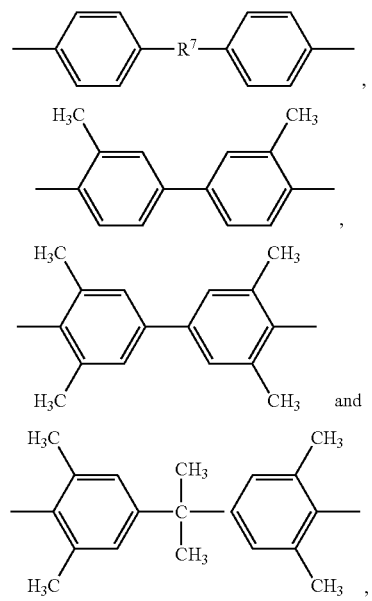

wherein $R^7$ is selected from —O—, —S—, —C(O)—, —SO$_2$—, —SO—, a $C_1$-$C_{20}$ alkylene group, a halogenated $C_1$-$C_{20}$ alkylene group and a $C_1$-$C_{20}$ perfluoroalkylene group.

5. The copolymer according to claim 1, wherein $R^5$ is selected from the following groups:

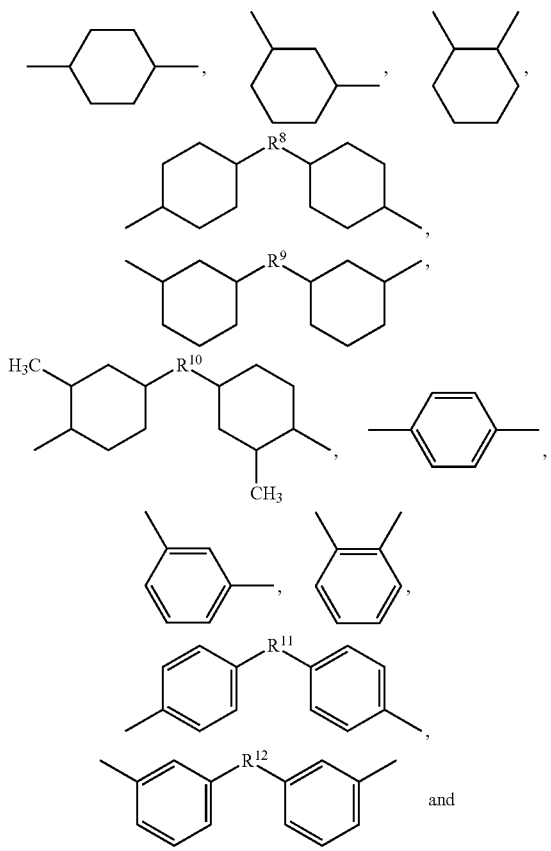

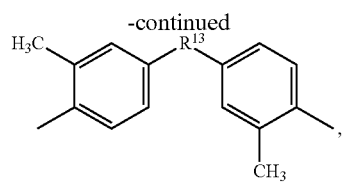
wherein $R^8$ to $R^{13}$ are each independently selected from a $C_1$-$C_{20}$ alkylene group, a halogenated derivative of a $C_1$-$C_{20}$ alkylene group and a $C_1$-$C_{20}$ perfluoroalkylene group.
6. The copolymer according to claim 1, wherein the copolymer is represented by any one of Formula II to Formula IV:

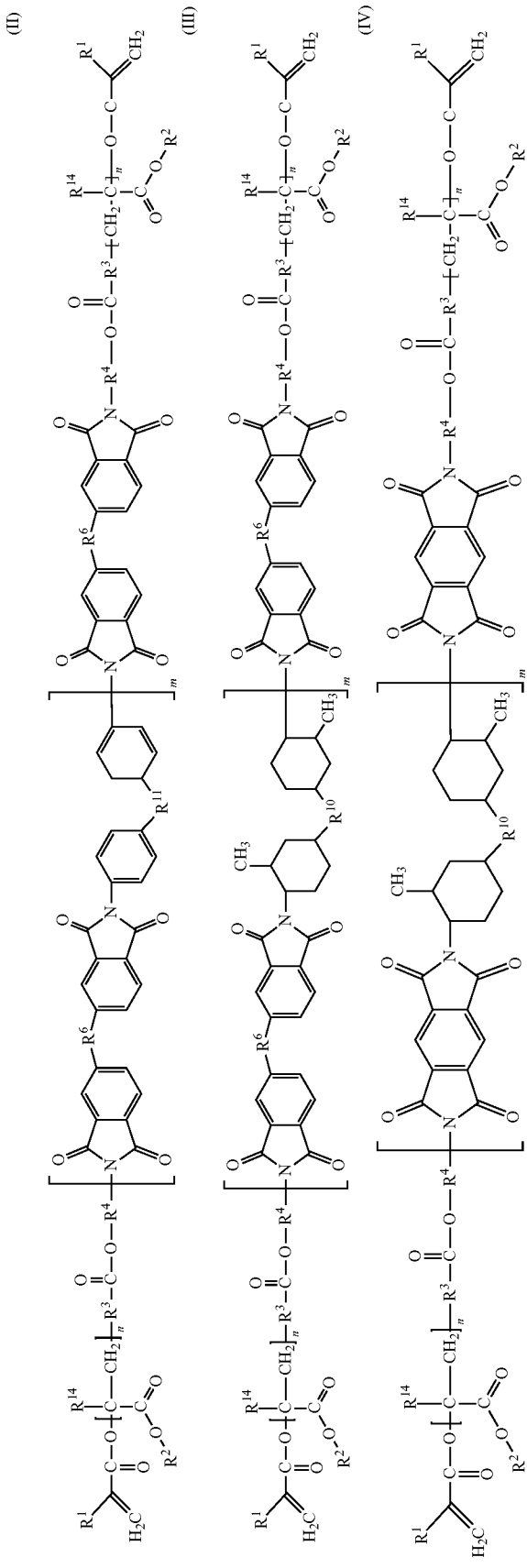

wherein $R^1$ to $R^4$, $R^{14}$, m and n are each as defined in claim 1, $R^6$ is selected from —O—, —S—, —C(O)—, —SO$_2$—, —SO—, $C_1$-$C_{20}$ alkylene groups, halogenated $C_1$-$C_{20}$ alkylene groups, $C_1$-$C_{20}$ perfluoroalkylene groups, and groups represented by —O—Z—O—, wherein Z is a divalent linking group selected from the following groups:

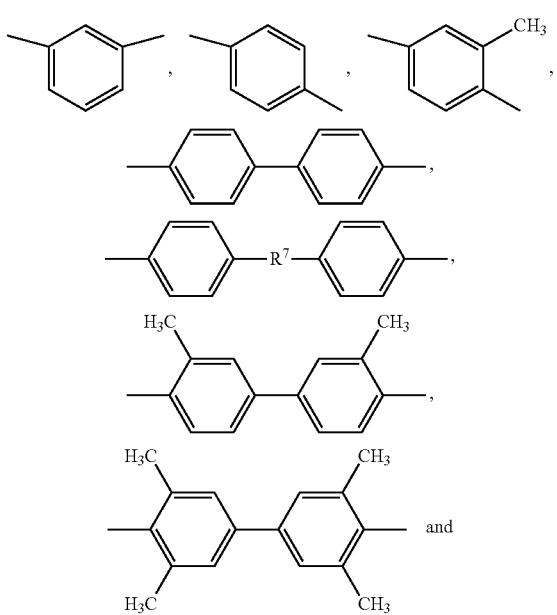

and

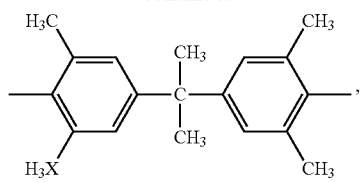

wherein $R^7$ is selected from —O—, —S—, —C(O)—, —SO$_2$—, —SO—, $C_1$-$C_{20}$ alkylene groups and halogenated $C_1$-$C_{20}$ alkylene groups (including $C_1$-$C_{20}$ perfluoroalkylene groups), $R^{10}$ is selected from $C_1$-$C_{20}$ alkylene groups, halogenated derivatives of $C_1$-$C_{20}$ alkylene groups; and $C_1$-$C_{20}$ perfluoroalkylene groups, $R^{11}$ is selected from $C_1$-$C_{20}$ alkylene groups, halogenated derivatives of $C_1$-$C_{20}$ alkylene groups; and $C_1$-$C_{20}$ perfluoroalkylene groups.

7. The copolymer according to claim 1, having a number average molecular weight (Mn) from 2,000 to 1,000,000 Daltons as measured by GPC.

8. The copolymer according to claim 1, wherein the number ratio of the polyimide block to the poly(meth)acrylate block, (m:2n) is 1:1 to 1:100.

9. A method for preparing the block copolymer according to claim 1, comprising:
reacting a diamine, a dianhydride and a monoamine to form a polyamic acid according to scheme 1 below;

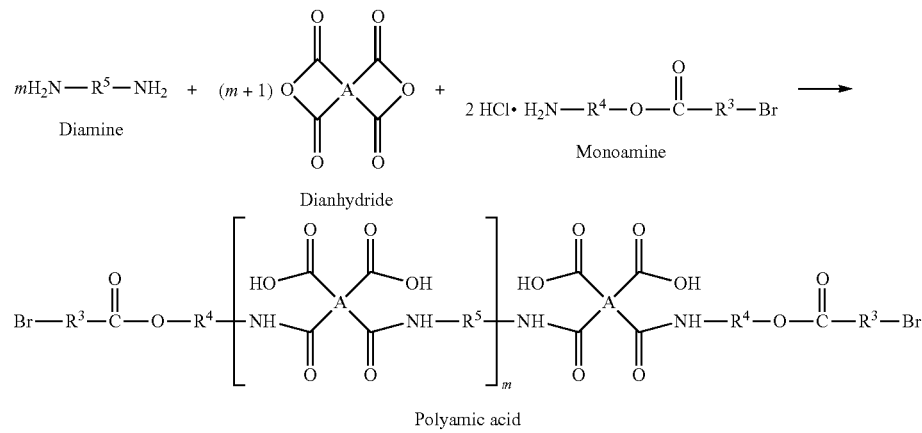

dehydrating the polyamic acid to form a polyimide;
reacting the polyimide and a (meth)acrylate to form a bromine-terminated poly(meth)acrylate-block-polyimide-block-poly(meth)acrylate copolymer represented by formula V;

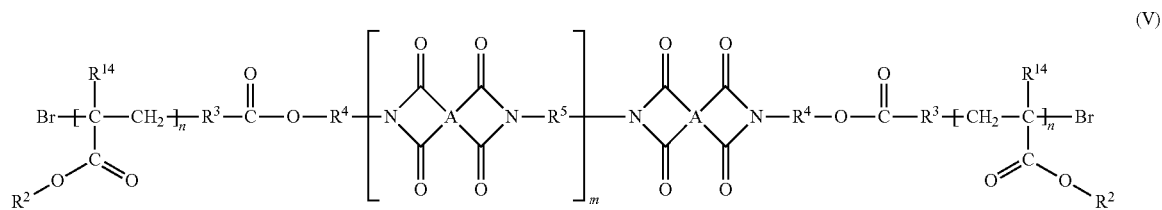

(V)

and reacting the bromine-terminated poly(meth)acrylate-block-polyimide-block-poly(meth)acrylate copolymer with (meth)acrylic acid to form the (meth)acrylate-functionalized poly(meth)acrylate-block-polyimide-block-poly(meth)acrylate copolymer represented by Formula I, wherein $R^1$ to $R^5$, $R^{14}$, A, m and n are each as defined in claim 1.

10. A photocurable adhesive composition comprising the copolymer according to claim 1, wherein the adhesive composition is a liquid optically clear adhesive.

11. The adhesive composition according to claim 10, further comprising a (meth)acrylate monomer and/or a photo initiator.

12. The adhesive composition according to claim 10, further comprising a mono-functional or di-functional (meth)acrylate monomer and/or a photo initiator.

13. The adhesive composition according to claim 10, further comprising a (meth)acrylate monomer and/or a photo initiator selected from benzoin ether photoinitiator, benzil ketal photoinitiator, acetophenone photoinitiator, anthraquinone photoinitiator, thioxanthone photoinitiator, benzophenone photoinitiator, acyl phosphine oxide photoinitiator, benzoate photoinitiator and any combination thereof.

14. An article comprising two substrates bonded together by cured reaction products of the adhesive composition according to claim 10.

\* \* \* \* \*